United States Patent [19]

Nelson

[11] Patent Number: 5,415,595
[45] Date of Patent: May 16, 1995

[54] DIFFERENTIAL GEARING WITH PHASE ADJUSTMENT

[75] Inventor: Bertel S. Nelson, Rockford, Ill.

[73] Assignee: Wedgtrac Corporation, Rockford, Ill.

[21] Appl. No.: 123,797

[22] Filed: Nov. 3, 1993

[51] Int. Cl.⁶ ............................................ F16H 1/46
[52] U.S. Cl. ......................................... 475/7; 475/221
[58] Field of Search .................... 475/7, 5, 228, 248, 475/290, 302, 221, 269, 330, 338, 339, 340

[56] References Cited

U.S. PATENT DOCUMENTS 1,317,075  9/1919  Couse ................................. 475/221
2,363,201  11/1944  Popoff ................................. 475/7

OTHER PUBLICATIONS

Harmonic Drive, "HDB Phasing Differential Gear Sets", 1990, pp. 1–3.

Primary Examiner—Charles A. Marmor
Assistant Examiner—Sherry Estremsky
Attorney, Agent, or Firm—Robert M. Wolters

[57] ABSTRACT

Differential gearing is provided between an input shaft and an output shaft. The gearing comprises a pair of similar gear sets mounted in confronting, coaxial relation, and may comprise known differential gearing such, for example, as planetary gearing or harmonic drive gearing. A control effects differential speeds between the input and output shafts. A spring loaded friction clutch acts between the input and output shafts, and parallel with the differential gear sets, to reduce the loading on the gear sets, and to provide an essentially zero backlash torque connection between the input and output shafts. The friction clutch may be used to provide loading or drag to a gear set at the end of a series of gears.

17 Claims, 6 Drawing Sheets

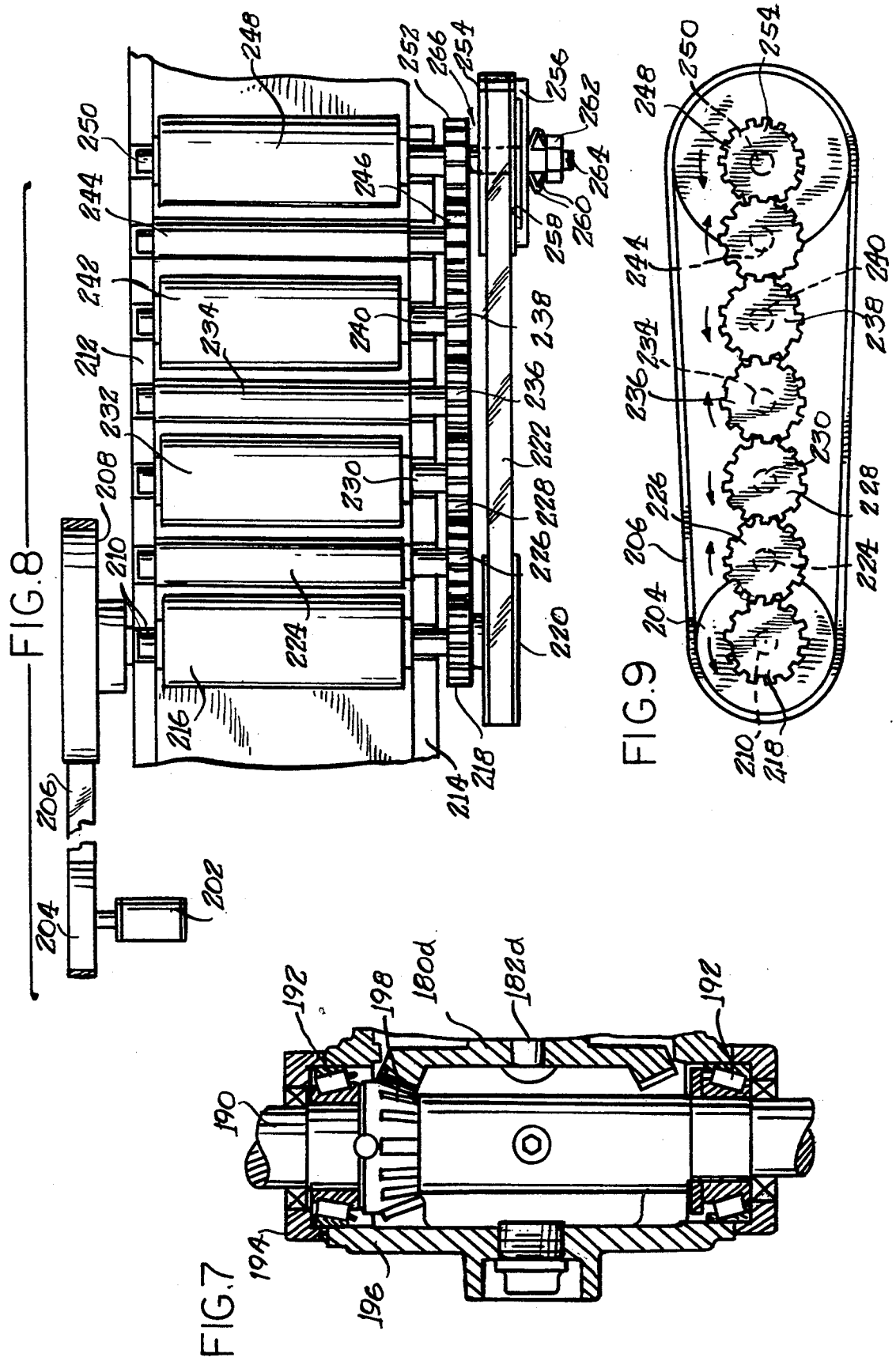

DIFFERENTIAL GEARING WITH PHASE ADJUSTMENT

BACKGROUND OF THE INVENTION

In various manufacturing operations a power source, such as an electric motor, may drive a shaft which in turn drives an apparatus at a fixed speed. It will be understood that this speed could be changed by changing the speed of the motor, or by a speed changing gear box or the like between the motor and the shaft. However, by way of a specific example, it is often desired to have the speed of the driven apparatus remain constant. Nevertheless, it may be desirable from time to time to have the phase of the driven apparatus differ from the phase of the driving motor (or a gear box from the driving motor).

Prior art apparatus known to me for obtaining such phase adjustment suffers from excessive backlash.

OBJECTS AND SUMMARY OF THE PRESENT INVENTION

It is an object of the present invention to provide a differential gear set with phase adjustment with a unique structure for supporting the various rotating structures.

It is another object of the present invention to provide differential action in a gear box including a double set of planetary gearing, which differential action is controlled by a control gear, illustratively a worm and worm gear.

Yet another object of the present invention is to provide a gear box of the type set forth in which there is absolutely zero or minimum backlash or lost motion.

In obtaining the foregoing and other objects and advantages I have provided a double planetary gear set in axial alignment in a common gear box. Each planetary gear set is in a separate carrier. Each carrier has planet gears with external teeth meshing with internal teeth of members each having a one-half worm gear on the periphery. As long as the worm is not rotated, the two latter members are fixed in position, and the input and output shafts rotate synchronously. The two members having the internal teeth with the half worm gears, have respectively different numbers of teeth on these worm gears, but are generally similar. Thus, when the worm is rotated, the members having the internal teeth will cause the carriers to move at slightly different speeds to adjust the phase between the input and output shafts.

Also I have provided a unique design which eliminates the use of internal gearing and is capable of being made to an extremely broad range of control ratios. This drive can also incorporate a friction slip clutch for minimizing backlash.

THE DRAWINGS

The present invention will be best understood with reference to the following drawings when taken in connection with the ensuing specifications, wherein:

FIG. 7 is a fragmentary sectional view of a further modification of the invention with input and output shafts at right angles to one another;

FIG. 8 is a top or plan view a modification of the invention using a series of rollers in a printing press;

FIG. 9 is front view of the embodiment of FIG. 8,

FIG. 10 is a further modification of the invention which eliminates the internal gears, comprising substantially a cross section along line 10—10 of.

DETAILED DISCLOSURE OF THE ILLUSTRATED EMBODIMENTS

Figure 1:
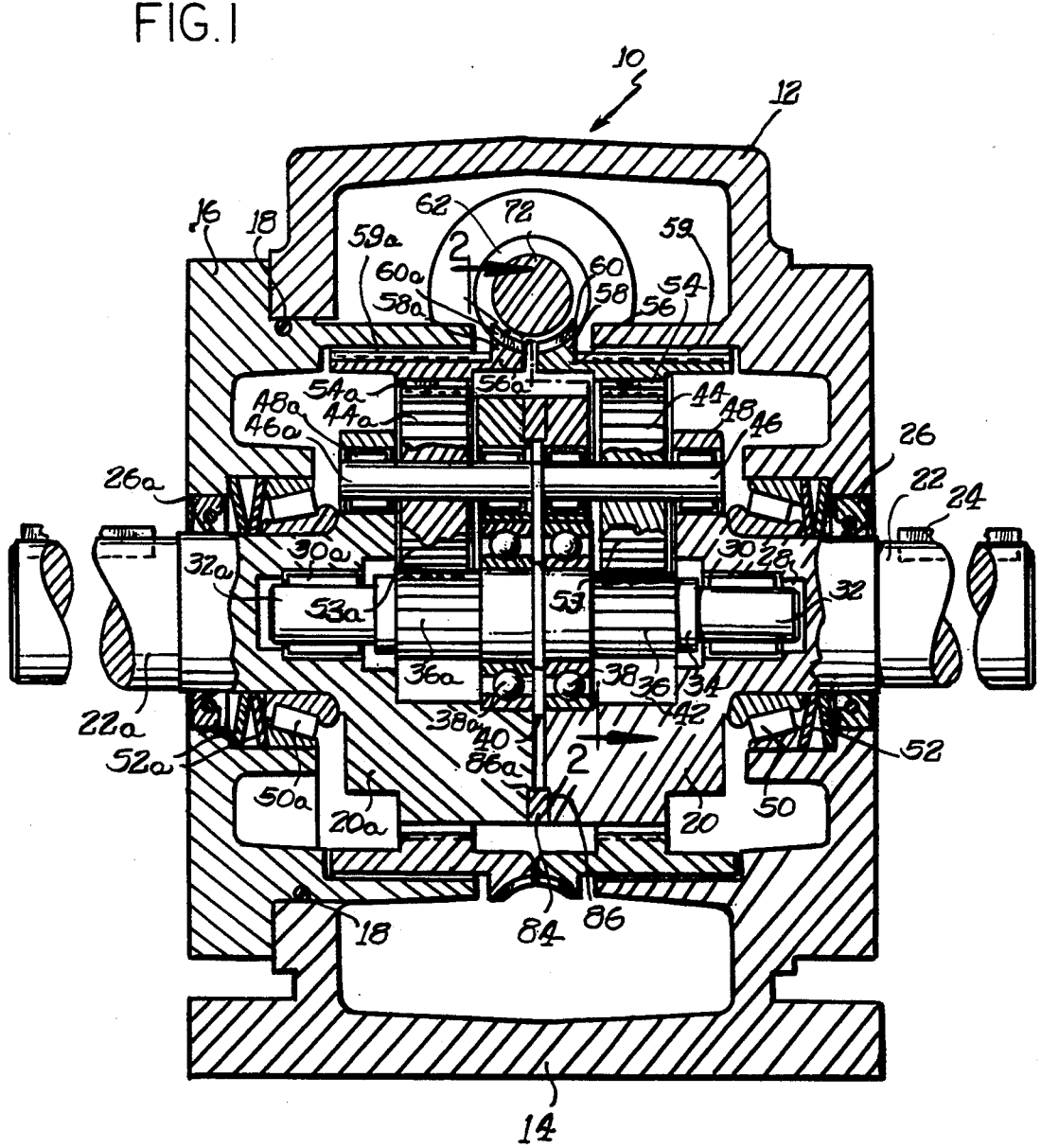
FIG. 1 is an axial view through differential gearing as constructed in accordance with the present invention.
Figure 2:
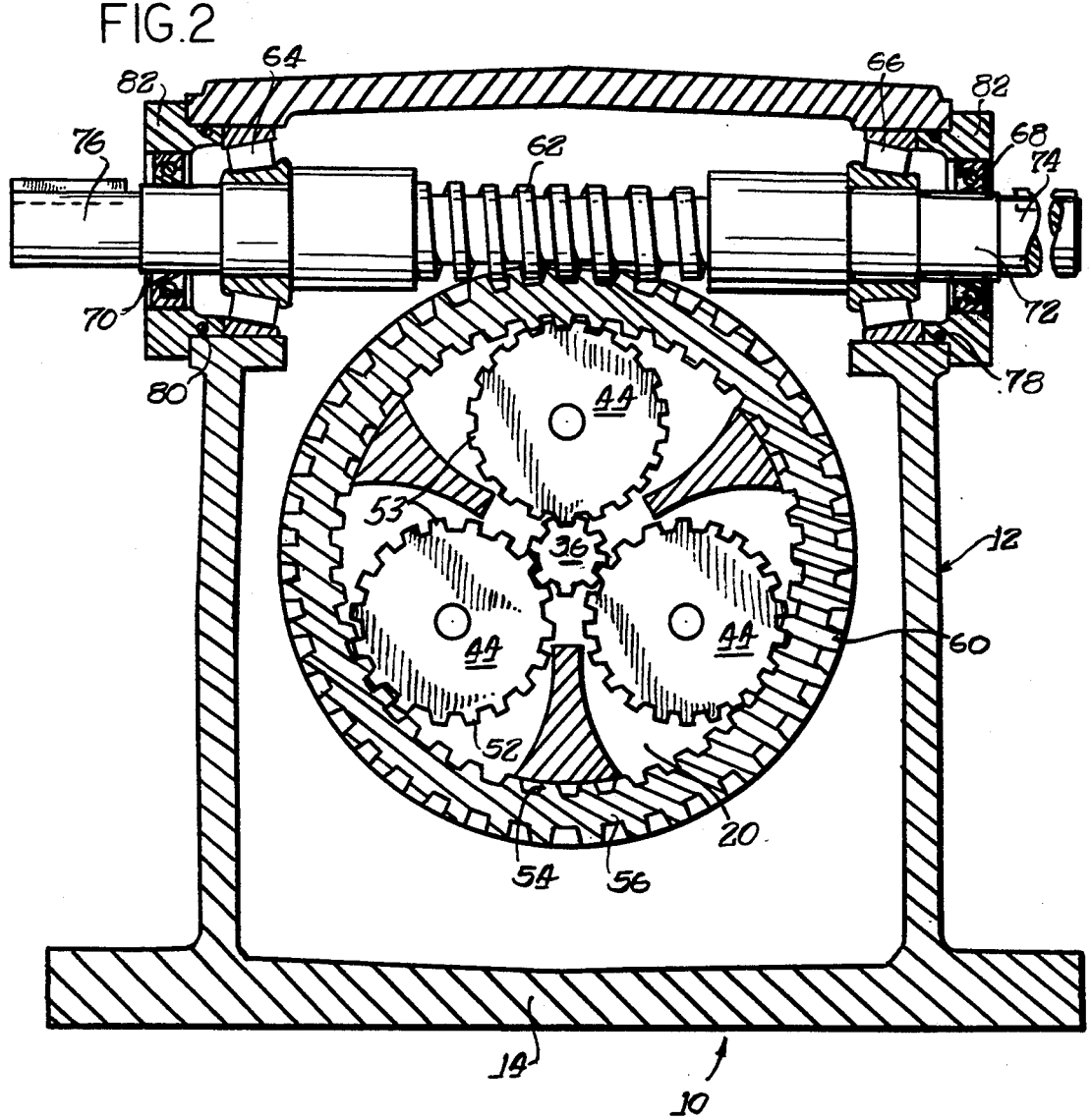
FIG. 2 is a cross sectional view taken substantially along the line 2—2 in FIG. 1.

Turning now in greater particularity to the drawings, and first to FIGS. 1 and 2, there will be seen differential gearing 10 constructed in accordance with the principles of the present invention. The gearing includes a gear box having a main housing 12 which is generally cup shaped, being open at one end, and having a supporting base 14. A large cover 16 interfits with the housing, and is sealed thereto by an O-ring 18.

For purposes of discussion, the right side (FIG. 1) will be referred to as the input side, while the left side will be referred to as the output side. From a mechanical standpoint either side could be the input and the other side the output. However, for purposes of this initial disclosure the right side will be referred to as the input side, and the left side as the output side.

An input carrier 20 is disposed within the right half of the housing, and an integral shaft 22 extends out of the housing, and is provided with a keyway and key 24 for connection to an input motor or gear shaft. An oil seal 26 is disposed about the shaft 22 in the right end portion of the housing 12. The input carrier 20 is provided with a cylindrical concentric cavity 28 containing a roller bearing 30 that journals the right end 32 of a shaft 34. Spaced to the left of the right end 32 of the shaft is an integral sun gear 36. To the left of the sun gear the shaft is journaled in ball bearings 38 which are located by an enlargement 40 encircling the shaft. The ball bearings are also journaled in an enlarged cavity 42 of the input carrier 20. The left portion of the shaft 34 will be discussed subsequently with regard to the output end of the gear box.

Three planet gears 44 are mounted on respective planet gear shafts 46 journaled in respective roller bearings 48 in the input carrier 20. Tapered roller bearings 50 further journal the integral shaft 22 and input carrier 20 in the main housing 12, and disc type springs 52 maintain axial pressure on the tapered roller bearings 50.

The peripheral teeth on the planet gears 44 mesh with internal teeth 54 of an input side internal gear 56 which is supported in the housing 12 by sleeve bearings 59 and 59A. The input side internal gear extends cylindrically to the left, and carries an input side worm gear half having worm teeth 60 thereon. The gear teeth 60 mesh with a worm 62 journaled at opposite ends and taper roller bearings 64 and 66 respectively which are mounted in appropriate openings in the main housing 12. Oil seals 68 and 70 act to retain oil in the enclosure formed by busing 12 and cover 16. The worm shaft 62 axis is essentially at right angles to main drive axis and carries outward extensions 74 and 76 from the housing. However, it will be understood that it is necessary for the shaft to extend only in one direction from the housing. O-rings 78 and 80 seal the caps 82 carrying the oil seals 68 and 70.

The structure herein described with reference to the right hand input side of the busing is essentially duplicated at the left hand output side. To avoid unnecessary duplication of description, like parts on the left hand side are identified by the same numerals as on the right side, but with the addition of the suffix a.

Although the input structure and the output structure as described hereinabove are substantially mirror images of one another, there is an important distinction which must be borne in mind, and which is critical to operation of the present gearing. That is, the number of teeth 60 and 60a of the half worm gears 58 and 58a differs in number. The double sun gearing 36 and 36a formed on shaft 34 has identical teeth on both portions thereof, and by way of example, this would be 15 teeth. Each of the six planet gears has 36 teeth, while the internal gears 56 and 56a have 87 teeth each. The critical distinction is that the two worm gear halves have different numbers of teeth. I The input side control worm gear teeth equal 48 in number, whereas the output side control gear half has 50teeth. The control worm 62 is shown simply for ease of illustration, but preferably has four starts or threads.

Due to the different numbers of worm teeth there will be a differential action in the control worm gears when the control worm is rotated. In the example just stated, 1,000 revolutions of the control worm will advance or retard (depending on the direction in which the worm is turned) the output shaft. The input internal gear 56 will rotate 1,000×4/48=83.333 revolutions, while the output internal gear 56a will only rotate 1,000×4/50=80,000 revolutions, or a net difference of 3.333 revolutions. This will advance (or retard) the output shaft 22a relative to the input shaft 22 by 3.333×87/15/(1+87/15)=2.8428 revolutions. Thus, the so called control ratio would be 1,000/2.8428=351.759 to 1. Obviously, if the worm is not turned, both worm wheels and the internal teeth 54, 54a thereof will be fixed, and the output shaft will rotate exactly the same as the input shaft.

In competitive gear boxes known to me, the internal gear on either the input or the output side is fixed to the housing, and the other internal gear is rotated by the control worm and gear. To attain the above control ratio of 351.759 a control worm gear set of about 300 to 1 ratio would be required, and this is not practical. It requires going to a combination i.e. 60 to 1 in the control worm gear set and a 5 to 1 prefix gear set.

Not only is a reasonable differential action produced by the gearing as described, particularly as contrasted by prior gearing, which as noted, would require about a 300 to 1 ratio, which is not practical. In comparing advantages of the differential control gear approach as contrasted with conventional design there is a much higher efficiency, estimated at 90 percent as contrasted with 50 percent in known designs. Gear reaction loads interact within the worm threads in engagement and do not reach the housing itself, or produce thrust loads in the control worm bearings. There is, therefore, a minimum force acting to produce reverse rotation of the worm with the control motor not engaged.

Certain aspects of the present invention as provided by the foregoing structure should now be considered. The sun gears 36 and 36a are essentially supported on the two needle or roller bearings 30 and 30a. These are located centrally with the line of action of each of the two tapered roller bearings 50, 50a, and these in turn are supported in the main housing 12 and the large cover 16. This arrangement establishes the axis of rotation of the sun gearing coaxial with the main axis of gear box itself, even without the axis of rotation of the input or output shaft being established by the single roller bearings 26, 26a used on the shaft. The sun gearing also carries the two ball bearings 38 and 38a which support the inboard ends of the input and output shaft,with integral carriers, which assures rotation of these shafts coaxial with the gear box. Also the spread bearing span provides for significant radial loads to be carried by the extensions of these shafts beyond the gear box itself. This arrangement is more compact and less expensive to make than commercial bearing arrangements known to me. This arrangement of gearing support is covered by U.S. Pat. No. 4,832,659 of which I am the inventor.

In a precision 1 to 1 gear box of this general type, it is often necessary or at least desirable to have substantially no (or at least minimum) backlash or lost motion between positioning or resisting torque conditions and overhauling or reverse torque conditions. In a competitive and conventional design the usual amount of backlash is on the order of 30 to 45 arc minutes. This is principally because clearance must be provided between the gear tooth meshes or they may overheat and bind in operation, causing premature gear tooth failure.

In the present design there is an essentially zero backlash connection between the input and output shafts by the addition of the clutch or friction connection 84 in parallel with the gear drive. This clutch 84 is disposed between the axially confronting ends of the carriers 20 and 20a and specifically in recesses 86 and 86a therein respectively. The end faces of the carriers with internal shafts engage the faces of the clutch blade and are urged into contact by the heavy disc type springs 52 and 52a. It should be noted that the clutch plate is generally of a friction material with uniform coefficient of friction static or slipping. The proportions illustrated in the drawings should provide a connecting torque of say 675 inch pounds, and the gearing proper a torque rating of 1,000 inch pounds for a total capacity of 1675 inch pounds. Thus, the first 675 inch pounds of load, or 40 percent, would be at very low backlash, on the order of a few arc minutes, which would satisfy the majority of applications. It is apparent that variation in design proportions could satisfy virtually any applications.

Figure 3:
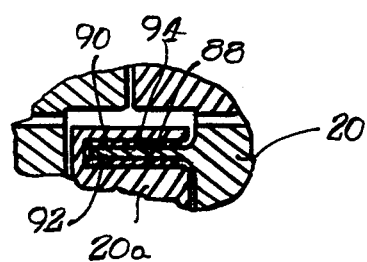
FIG. 3 is a fragmentary view illustrating a modification of the invention.

The clutch plate design requires that the tapered roller bearings 50 and 50a withstand substantial axial thrust forces. A modification of the design eliminates the necessity of withstanding such thrust forces, and is illustrated in FIG. 3. The input carrier 20 is provided with an axially extending cylindrical flange 88 which extends into an aligned annular groove or slot 90 in the output carrier 20a. The spaces between the projecting cylinder 88 and the slot or groove 90 are filled with suitably formed spring steel or other suitable resilient material annular strips 92 and 94. The radial thrust forces thus counteract one another, and no unusual input loads are imposed upon the carrier support bearings. Such strips are known as tolerance rings, and are commercially available and inexpensive. By way of example such tolerance rings are manufactured by Rencol Tolerance Rings in England, and are, also made in the United States by USA Tolerance Rings, West Trenton, N.J. A 2 inch diameter by 1 inch wide (axially) ring has a non-slip capacity of 2,210 inch pounds. A 3.25 diameter by 0.750 axial dimension ring would easily fit into the subject design. We have 2210×3.250/2, or 3591 rating for a 1 inch wide (axial) ring, and 2693 inch pounds for the 0.750 axial width. It is sometimes desirable to be able to slip the connection continuously at low rpm slip speeds, and this would use somewhat less compression in the ring and reduce the torque rating to about 1,000 inch pounds or roughly equal to the gearing rating. The clutch plate design can be combined with the tolerance ring design, and a single ring or a multiplicity of rings can be used in parallel with each other.

As noted earlier, input and output references are for simplicity in explaining the design. These are relative terms and the function of either is interchangable with the other.

In a given application the input and output shaft timing or phase relationship may be adjusted through the control shaft (the worm shaft) to a desired location. There may be no further, or possibly only minor adjustments, required for many hours of machine operation. In other applications, continuous adjustment or trimming may be required. The differential designs as heretofore shown and described provide for either limited slipping of the clutch or tolerance ring when an adjustment is made, or for continuous slipping at lower slip speed revolutions. The specific embodiments shown and described are of the inline type, having the input and output shaft aligned with each other, and with a 1 to 1 speed ratio. Similarly, input and output shafts rotate in the same direction. It will be apparent that modifications can be made so that the input and output shafts are not necessarily in line or collinear with one another. The input and output shafts can be at an angle with one another, and the shaft rotation can be the same (as disclosed) or opposite. The proposed clutch or tolerance ring construction is often applicable to other drive arrangements, including the popular so-called harmonic drive type.

Figure 4:
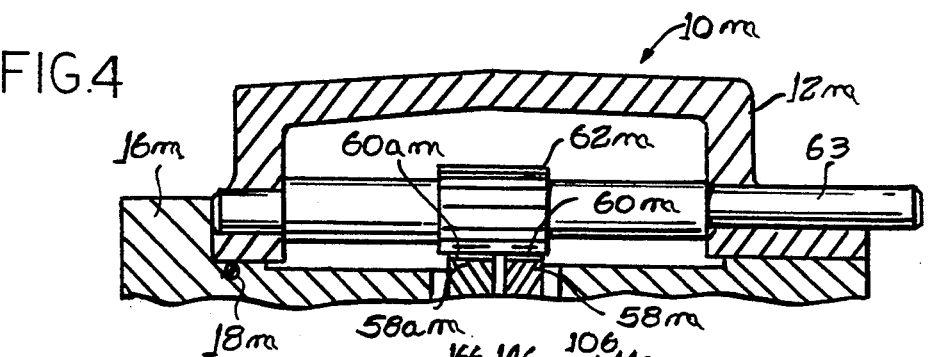
FIG. 4 is a fragmentary view corresponding to the top portion of FIG. 1 showing a modification of the invention.

The invention has been illustrated up to this point with a worm and half worm gears for adjusting the input and output shaft timing or phase relationship, and this is one excellent and convenient way to do it. However, spur gears can be used instead, as illustrated in FIG. 4. This is a fragmentary view corresponding the upper portion of FIG. 1, and similar numerals are utilized to identify similar parts, this time with the addition of the subscript m. Referring to FIG. 4, there are a pair of spur gears 58m and 58am which replace half worm gears in FIG. 1. These spur gears respectively have teeth 60m and 60am, and like the half worm gears they have different numbers of teeth. For exemplary purposes, the numbers of teeth on the spur gears may correspond to the numbers of teeth on the half worm gears. The geared teeth 60m and 60am mesh with the teeth of a smaller, but relatively elongated spur gear 62m formed on a shaft 63 suitably journalled in the upper of the main housing 12m. It will be understood that the shaft 63 can be appropriately supplied with bearings and with oil seals as in its counterpart in FIG. 2.

It will be understood that action of the embodiment shown in FIG. 4 is similar to that in FIGS. 1 and 2, except that the shaft 63 and spur gear 62m control the spur gears 58m and 58am.

An important feature of the modification in FIG. 4 is that the shaft 63 is parallel to the input and output shafts. This has been illustrated with spur gearing, but it will be apparent to those knowledgeable in the gear art that helical gears could be used instead of the spur gears. Further, it will be apparent that a motor drive can be connected to the shaft 63, or that a knob can be secured thereto for motor operated or manually operated control.

In FIG. 4 by way of example, the spur gear 62m could have 12 teeth. The left hand gear 58am may have 84 teeth, while the right hand gear 58m may have 83 teeth cut on a blank sized for 84 teeth. When the central shaft is rotated one thousand revolutions the left hand gear rotates 1,000×12/84=142.86 revolutions. The right hand gear 58m will rotate 1,000×12/83=144.58 revolutions, thus making a difference of 1.72 revolutions. As a result 1,000/1.72, or 581 revolutions of the control shaft will cause the right hand gear to rotate one complete revolution more than the left hand gear. With 15 tooth sun pinions and 87 tooth internal gears, we have a control ratio of $$581 \times \frac{(1 + 87/15)}{87/15} = 581 \times \frac{6.80}{5.80} = 790.1621.$$

Stated otherwise, 790.16 revolutions of the control shaft 63 will advance or retard the output shaft relative to the input shaft by one revolution, or 360°.

Very high control ratios can be achieved by securing two separate pinions with different numbers and pitch (size of tooth) side by side on the control shaft 63 in place of the single integral spur gear 62m, and meshing the teeth of these two separate pinions (both pinned to or formed integrally on the shaft 63) and meshing these spur gears with suitable mating gears. By way of example, if we assume the center distance between the control shaft 63 and the axis of rotation of the main shafts (corresponding to shafts 22 and 23 in FIG. 1) is 3 inches, then we can have a 13 tooth pinion meshing with a 92 tooth gear 58am and a 12 tooth pinion meshing with an 85 tooth gear 58m. The left hand gearing can be designed on oversized blanks and a standard 18 DP hob or cutting tool can be used to produce the gears for the left hand side. Similarly, the right hand gearing can be proportioned to be cut with a standard 16 DP (diametral pitch) hob. Now the control ratio will be 9168.28.

The examples of the invention heretofore set forth utilize planetary gearing. Such planetary gearing is not necessary. In the embodiment of the invention shown in FIG. 5 a harmonic drive transmission is utilized. Harmonic drive transmissions, including those with trim or phase adjustment are known per se, therefore a disclosure in exquisite detail is not necessary at this point.

Figure 5:
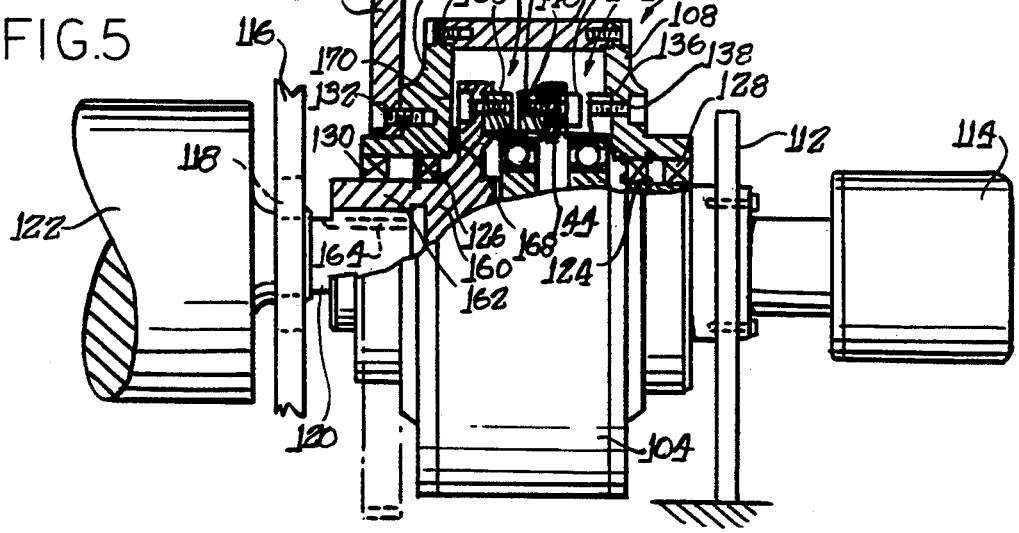
FIG. 5 is a view partially in section and partially a front view of a further modification of the invention.

Referring now in greater particularity to FIG. 5 there will be seen a harmonic drive transmission generally designated 102. This includes a housing 104 including a cylindrical body 106 and shaped end plates 108 (right) and 110 (left). A fixed support 112 is secured to the right end plate 108 for partial support of the harmonic drive transmission. The support 112 also supports a stepper motor 114 which is used for trim for phase control. The stepper motor could be supplanted by manual control. At the left side of the drawing a fixed support 116 is provided with bearings 118 supporting a shaft 120 affixed to a roll 122 which may be, f.i., a roll in a printing press.

The housing 104 is rotatably supported on ball bearings 124 at the right end and 126 at the left end. Oil seals 128 and 130 are disposed axially outwardly of the bearings 124 and 126 respectively. The housing has a spur gear 130 secured to the left end plate 110 thereof as by bolts 132. This is the input power gear, and causes the entire outer housing to rotate.

The harmonic drive comprises a dual set including identical parts. There is a right end set 134 including a power input circular spline 136 rotatably mounted on a shaft 138 in the right end piece or cover 108 of the housing. There also is an output circular spline 140 rotatably mounted by shaft 142 on a member 144. There is also a middle circular spline which does not show in FIG. 5.

The second set 146 includes a circular spline 148 mounted on the same shaft 142 as the circular spline 144, and a second circular spline 150 mounted on an inner rotating member 160 coaxial with the shaft 120. The inner rotating member 160 includes a hollow shaft 162 keyed to the shaft 120 as at 164. The harmonic drive unit 102 acts in a manner known in the art, with the addition of one additional part, namely a friction ring 166 interposed between a vertical surface 168 on the inner rotating member 160 and a confronting vertical surface 170 comprising the right face of the member or cap 110. Thus, the apparatus in FIG. 5 acts very similarly to that of FIG. 1, but relying on the harmonic drive dual set instead of the dual set of planetary gears in FIG. 1. The constant friction produced by the disk 160 insures against backlash and increases torque capacity, in the same fashion as the embodiment disclosed in FIGS. 1 and 2.

Figure 6:
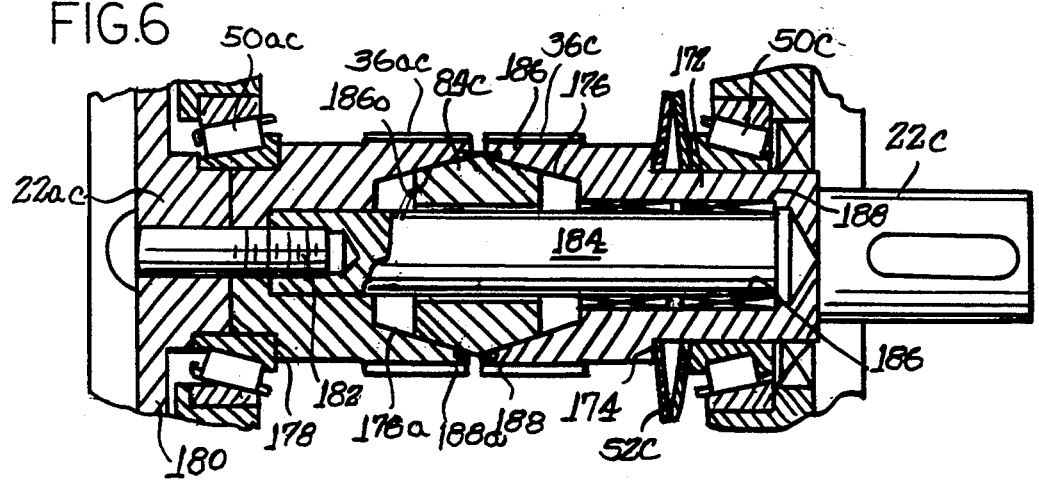
FIG. 6 is a similar view on a larger scale of a further modification of the invention.

In the embodiments of the invention as heretofore shown and described the clutch is a flat faced ring or disk. This shape is not essential to the invention as is shown in FIG. 6. Certain of the parts in FIG. 6 correspond to parts in FIG. 1, and are labeled with similar numerals with the addition of the suffix c. Only the inner or axial portion of the structure is shown in FIG. 6, but it could be substituted into FIG. 1 by one skilled in the art without any difficulty. The shaft 22c at the right end may be considered to be the input shaft for correspondence with FIG. 1, although as heretofore noted it really does not make much difference which is the input and which is the output end of the gearing array. A shaft 22c is formed integral with an extending cylinder 172, and this, in turn, is formed integrally with the sun gear 36c. Roller bearings 50c journal the extending cylinder part 172, and springs 52c bear against rollers 174 between cylinder 172 and the sungear 36c. The sun gear 36c is provided with an inner frustoconical recess 176 opening toward the left sun gear 36ac, which is also provided with a frustoconical recess 176a. The sun gear 36ac is provided with a shoulder 178 bearing against the roller bearing 50ac journalling the outer end of the sun gear 36ac. An output gear 180 is secured to the sun gear 36ac against relative rotation, and the output gear 180 is held to the sun gear 36ac by a bolt 182. Threaded into an axial shaft 184 journalled at the right end in bearings 186 is a cylindrical recess 188 along the axis of the sun gear 36c.

The distinguishing characteristic in the embodiment of the invention illustrated in FIG. 6 is that the clutch member 84c is a double-sided or double conical member engaging the sun gear frustoconical recesses 136 and 136a. The spring washers 52c maintain the two sun gears respectively pressed against the tapered surfaces 186 and 186a of the sun gears. The confronting ends 188 and 188a of the sun gears are spaced apart by the clutch member 84c.

In the embodiments of the invention as heretofore shown and described the input and output shafts are parallel to one another, and also coaxial. This is not necessary in a broad sense, as is illustrated in FIG. 7. In FIG. 7 there is a shaft 190 journalled by suitable roller bearings 192 in a housing 194 having a cover 196. The shaft has a spiral bevel pinion 198 pinned to it, and this spiral pinion meshes with a spiral bevel gear 180d secured by a bolt 182d to the shaft 184 of FIG. 6, for example. As noted heretofore it is not important which is considered to be the input and which is considered to be the output shaft. As will be understood from the previous reference of the structure of FIG. 6 to FIG. 1, adjustment of the phase of the input and output shafts remains possible as previously described with reference to FIG. 1.

In the embodiments of the invention as heretofore shown and described there has been a slipping clutch utilized in combination with a gear drive to produce phase adjustment of input and output shafts. Beneficial results can be obtained by utilizing a continuous slip clutch in parallel with a main gear drive to reduce sharply the normal backlash inherent in a conventional gear train, as is shown and described in connection with FIGS. 8 and 9, represent a portion of a small, high speed narrow web printing press having a drive motor 202 with an output shaft carrying a drive pulley 204 acting through a belt 206 to drive a pulley or sheave 208 fixed on a shaft 210. In most cases the motor 202 would be relatively substantially larger than shown. The motor is shown in reduced size for convenience of illustration. The shaft 210 is suitably journalled at one end in a machine frame portion 212 by means of a suitable sleeve or roller bearing. The opposite end of the shaft is suitably journalled in another machine frame portion 214 by means of suitable bearings. Between the two frame parts 212 and 214 the shaft carries a roll 216 fixed thereon. Outboard of the frame member 214 there is a spur gear 218 fixed on the shaft 210, and also a pulley 220 driving a belt 222. There is a succession of rolls and roller shafts, conveniently illustrated as four rolls and three shafts, driven from the gear 218. A shaft 224 is to the right of the shaft 210, and is suitably journalled by appropriate bearings in both frame members 212 and 214. The shaft has a gear 226 fixed thereon and meshing with the gear 218. The gear 226 in turn meshes with the gear 228 on a shaft 230 suitably journalled in the frame members 212 and 214. A roll 232 is fixed on the shaft 230. Another shaft 234 to the right of the shaft 230 is suitably journalled in the frame members 212 and 214, and has a gear 236 on the outer end thereof meshing with the gear 228. The gear 236 meshes with a gear 238 on a shaft 240 journalled in the frame members 212 and 214. A roll 242 is fixed on the shaft 238. Another shaft 244 is suitably journalled in the frame members 212 and 214, and carries on its outer end and fixed thereto a gear 246 meshing with the gear 238. Yet another roll 248 is fixed on a shaft 250 suitably journalled in the frame members 212 and 214. A gear 252 is fixed on the shaft 250, and meshes with the gear 246. All of the shafts lie in a common plane, and all the gears are the same diameter and the same number of teeth. Hence, all of the gears rotate at the same speed, although alternate gears rotate in opposite directions. Specifically, each of the shafts carrying a roll (and also the rolls) rotate in a counterclockwise direction, while the shafts having no enlarged roll thereon rotate in a clockwise direction. A pulley 254 is rotatably mounted on the rightmost shaft 250, and is free to rotate on that shaft. The pulley 254 is slightly larger in diameter than the pulley 220, and is driven by the belt 222. As a result, the pulley 254 rotates at a slightly slower speed rotationally than does the pulley 220. By way of a specific example, with the pulley or sheave 204 rotating counterclockwise at 500 RPM, the pulley or sheave 254 will rotate on the shaft 250 at 475 RPM.

A large friction clutch 256 having a recessed face 258 confronting the face of the pulley 254 is biased by a pair of spring washers 260 stressed by a nut 262 threaded on the threaded end 264 of the shaft 250. A relatively small friction clutch 266 is interposed between the opposite face of the pulley 254 and bears against the adjacent face of the gear 252. The large friction clutch 256 is keyed to the shaft 250, and thus rotates with the shaft. However, and extending the example previously noted, the pulley 220 rotates at 500 RPM, as do all of the gears and respective shafts. Thus, the gear 252 and the shaft 250 are driven at 500 RPM. However, and as previously noted, the pulley 254 is driven at only 475 RPM on the shaft 250. Thus, the friction disk 256 exhibits a constant drag on the pulley 254, and hence on the shaft 250, and also on all of the intervening shafts due to the 1 to 1 gearing of all of the shafts. There is normally, by way of example, 0.004" backlash from gear to gear. However, with the retarding effect just described the driving tooth faces and the driven tooth faces are held in tight engagement, and there is substantially no discernable backlash. The clutch 266 exerts a force directly on the face of the gear 252 to ensure a constant speed.

In certain applications it may be desireable to have the clutch elements driven at the same speed, 500 RPM, as the main drive or even at a high speed, say 525 RPM, to bring the coast sides of the gear teeth (rather than the drive sides) into contact.

Although not specifically so shown, the pulley and belt drives preferably comprise rubber drive belts with a plurality of V-grooves with corresponding valleys in the periphery of the pulleys. It will be apparent to one skilled in the art that the pulleys and drive belts could be replaced by suitable gear trains.

The loads carried by a printing press vary significantly from time to time, and without the present system the gears would almost constantly slap back and forth due to backlash coupled with the changing load. Such slapping back and forth allows the phase relationship of the rolls to change with respect to one another and this is undesireable. Such slapping also produces wear which increases the backlash. However, in the present structure with the constant retarding load the backlash is at all times taken up, and there is no slapping back and forth of the gear teeth with change in phase relationship and resulting wear thereof very little power is lost in this gear/pulley setup, and the efficiency thereof is accordingly quite high.

In all of the embodiments of the present invention there is a clutch which either slips continuously or intermittedly. Backlash is avoided, and in combination with a phase adjustment of input and output shafts there is no apparent backlash An the given transmission.

Figure 10:
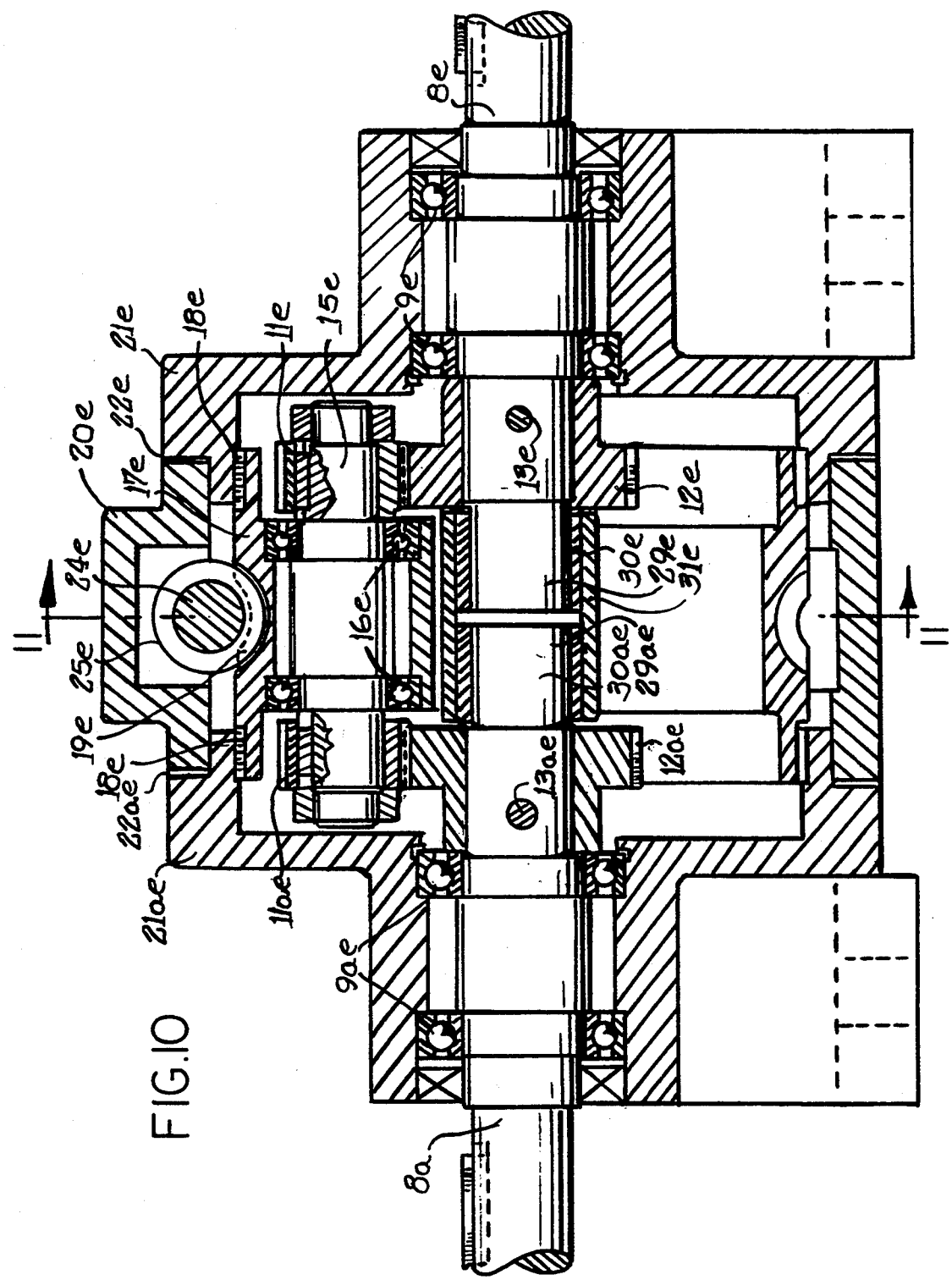
Figure 11:
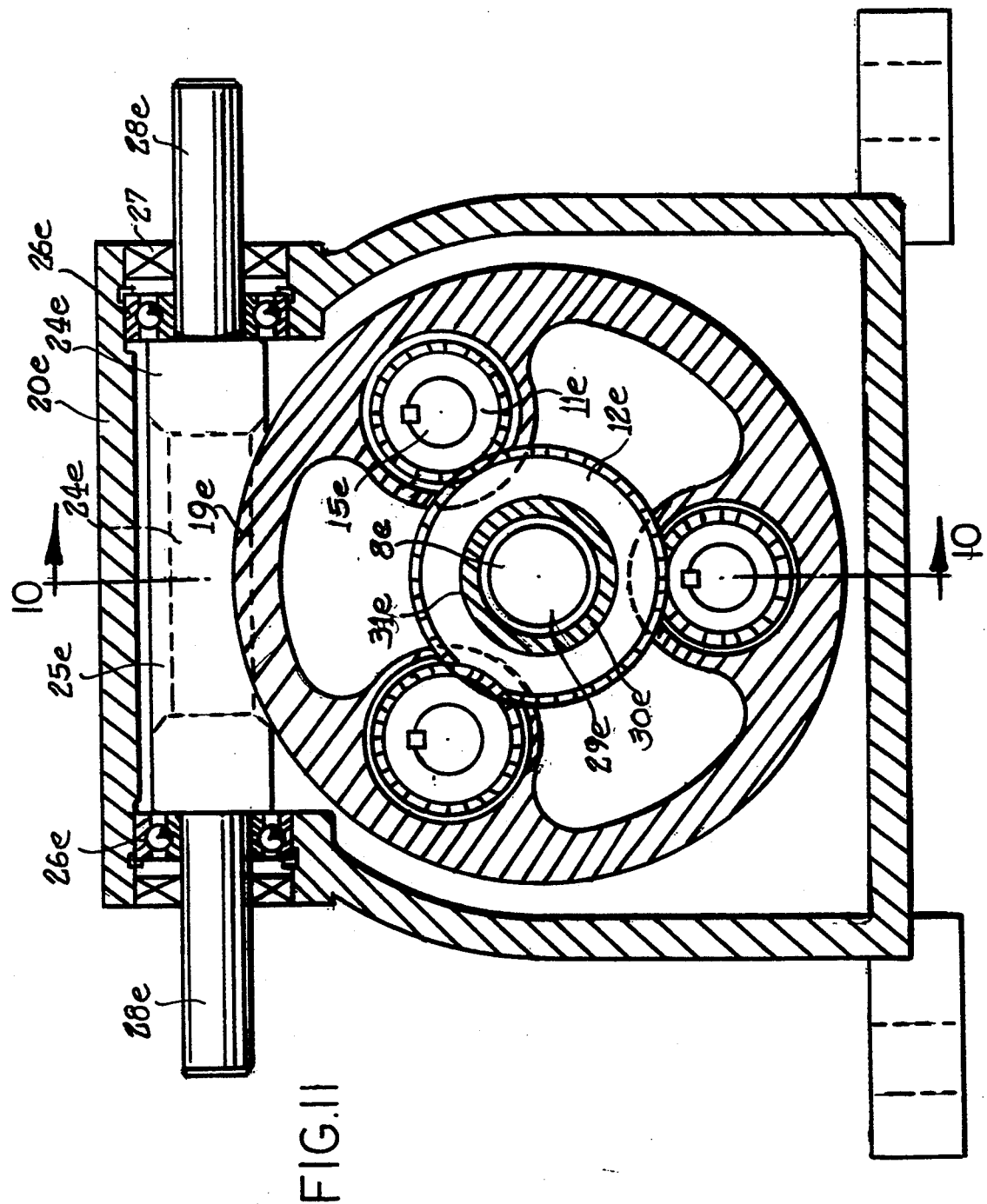
FIG. 11, and FIG. 11 is a cross-section of FIG. 10 taken substantially along the line 11—11 in FIG. 10.

FIGS. 10 and 11 depict yet another embodiment of the invention. Here a housing 20e is closed off by footed covers 21e and 21ae which are secured to housing 20e and sealed to prevent oil leaks by gaskets 22e and 22ae. The covers 21e and 21ae support an input shaft 8e and an output shaft 8ae on sets of bearings 9e and 9ae. An input spur of helical gear 12e and an output spur or helical gear 12ae are pinned to their respective shafts 8e and 8ae by cross-pins 13e and 13ae. Gears 12e and 12ae mesh with sets (typically three) of mating pinion gears 11e and 11ae which are keyed to and supported from cross shafts 15e (typically three) which are in turn supported by sets of two bearings 16e per cross shaft 15e. These bearing sets 16e are mounted in suitable location in carrier 17e which is supported and located by two sleeve bearing 18e pressed into covers 21e and 21ae. Worm gear teeth 19e are cut into the periphery of carrier 17e. These worm gear teeth 19e mesh with worm threads 25e formed integrally into worm 24e which is supported by a set of two bearings 26e mounted in bores of housing 20e. Two oil seals 27e are used to prevent oil leakage. The worm 24e carries integral shaft extensions 28e protruding outside the housing 20e.

The input shaft 8e and the output shaft 8ae carry extension diameters 29e and 29ae inwardly to close proximity with each other near the center of the unit. A set of Tolerance Rings 30e and 30ae are placed between shaft diameters 29e and 29ae and a connecting sleeve 31e. Thus a fixed torque slip clutch transmits torque between input shaft 8e and output shaft 8ae with zero or minimum backlash. Further this connection sets up a "power loop" between gearing items 12e, 11e, 11ae and 12ae holding these gear teeth in contact with each other and preventing "slapping" of these gear teeth through the backlash between the teeth as the transmitted load imposed by the equipment being driven varies or even reverses direction sense from "resisting" to "helping" load.

In order to function as a phase shifting differential gear box the step up ratio of the input gear set 12e-11e must be different from the reduction ratio of the output gear set 11ae-12ae. When this condition applies, rotation of the control shaft 28e will cause rotation of the carrier 17e and a rotational phase shift between input shaft 8e and output shaft 8ae as desired.

In practice, many different ratios of speed difference between input shaft 8e and output shaft 8ae can be provided and all by using standard production cutting tools (hobs) for generating either spur or helical gears. By comparison, competitive drives known to me utilize internal spur gears. The well recognized advantages of helical gearing over spur gearing can not be readily obtained in these competitive drives except by special and expensive cutting tools and cutter guides. Also internal gears are more expensive to make than external gears (as used in my invention) and can not easily be made to the same desireable high standards of gear tooth accuracy.

By way of illustrating the flexibility of the design of my invention I will assume that the load being imposed on the drive will require that the operating center distance between gear sets 12e and 11e, and between gear sets 11ae and 12ae, is 2.0000 inches. Further that a 3.6250 inch operating center distance will be used between control worm gear teeth 25e and carrier gear teeth 19e. Then for a relatively low overall control ratio (defined as the number of turns of the control worm 28e to advance (or retard) the output shaft 8ae one complete turn relative to input shaft 8e) I can use the following detail gear tooth design for the main drive:

| Main Gearing Item | 12e | 11e | 11ae | 12ae |
|---|---|---|---|---|
| Number of Teeth | 66 | 30 | 30 | 60 |
| Normal Diam Pitch | 26 | | 24 | |
| Helix Angle, deg. | 22.6199 | | 20.3641 | |
| Hand of Helix | Right | Left | Left | Right |
| Pitch Diameter | 2.7500 | 1.2500 | 1.3333 | 2.6667 |
| Gear Set Ratio | 2.2000 step-up | | 2.0000 reduction | |
| Main Drive Ratio | 1.1000 step-up or 11/10 fractional | | | |

Now it will be seen that if the input shaft 8e is held fixed and the carrier 17e is rotated 1 full turn then the output gear 12ae will rotate through 6 teeth. Since there are 60 teeth on this gear, 60/6 or 10 rotations of carrier 17e will produce 1 rotation (360 degrees) of output shaft 8ae relative input shaft 8e. The overall control ration is the carrier ratio of control multiplied by the control worm gear set ratio.

The detail design of a relatively low ratio control worm gear set follows:

| Worm Gearing Item | Worm 18e | Gear 24e |
|---|---|---|
| Number of Teeth | 10 | 38 |
| Normal Diametral Pitch | 12 | |
| O.D. Modified, no of teeth | 1.00 | −.85 |
| Helix Angle, degrees | 30 | 60 |
| Modified Pitch Diameter | 1.0585 | 6.1917 |
| Control Worm Gear Set Ratio = 38/10 = 3.800 to 1 | | |
| Overall Control Ratio = 10.000*3.800 = 38.000 to 1 | | |

Now as an example of an extremely low difference in step up ratio in the main drive gearing and a correspondingly extremely high control ratio, the following design applies:

| Main Gearing Item | 12e | 11e | 11ae | 12ae |
|---|---|---|---|---|
| Number of Teeth | 75 | 37 | 40 | 81 |
| Normal Diam Pitch | 30 | | 32 | |
| Helix Angle, deg. | 21.0395 | | 19.0363 | |
| Hand of Helix | Right | Left | Left | Right |
| Pitch Diameter | 2.6786 | 1.3214 | 1.3223 | 2.6777 |
| Gear Set Ratios | 2.027027 step-up | | 2.025 reduction | |
| Main Drive Ratio | 1.001001 step-up = 1000/999 fractional | | | |
| Carrier Control Ratio = 999 to 1 | | | | |

A very high ratio control worm gear set could be as follows:

| Worm Gearing Item | Worm 18e | Gear 24e |
|---|---|---|
| Number of Teeth | 1 | 74 |
| Normal Diametral Pitch | 12 | |
| OD Modified, no of teeth | 0.000 | 0.025 |
| Helix Angle, degrees | 85.50 | 4.50 |
| Modified Pitch Diameter | 1.0621 | 6.1878 |
| Control Worm Gear Set Ratio = 74/1 = 74.000 to 1 | | |
| Overall Control Ratio = 999.00*74.00 = 73,926.00 to 1 | | |

A more useful ratio gear set (intermediate range) could be:

| Main Gearing Item | 12e | 11e | 11ae | 12ae |
|---|---|---|---|---|
| Number of Teeth | 54 | 27 | 25 | 48 |
| Normal Diam Pitch | 22 | | 20 | |
| Helix angle, dgrees | 23.0074 | | 24.1462 | |
| Hand of Helix | Right | Left | Left | Right |
| Pitch Diameter | 2.6667 | 1.3333 | 1.3699 | 2.6301 |
| Gear Set Ratios | 2.0000 step-up | | 1.9200 reduction | |
| Main Drive Ratio | 1.041667 step-up or 25/24 fractional | | | |

| | |
|---|---|
| Carrier Control Ratio = 24 to 1 | |

The worm gearing for this intermediate ratio system can be:

| Worm Gearing Item | Worm 18e | Gear 24e |
|---|---|---|
| Number of Teeth | 4 | 70 |
| Normal Diametral Pitch | 12 | |
| OD Modified, no. of teeth | 0.000 | 0.493 |
| Helix Angle, degrees | 71.75 | 18.25 |
| Modified Pitch Diameter | 1.0644 | 6.1856 |
| Control Worm Gear Set Ratio = 70/4 = 17.50 to 1 | | |
| Overall Control Ratio = 24.00*17.50 = 420.00 to 1 | | |

It can be noted that, in all three of the above examples, that I have used numbers of teeth in main drive gears 12e and 12ae that are exactly divisible by the number of sets (in this case three) of the mating pinion gears 11e and 11ae that are used. When this is done, the pinions 11 and 11a (in sets of three each) are identical with each other including the rotational location or timing of the pinion teeth to the keyseat and the pinions can be expected to share the loading from the gears 12e and 12ae uniformly between themselves.

In many applications it is required that the input and output shafts be co-axial, run in the same direction and at the same speed. It is noted that, in my invention, a slight difference in speed is present. For example in the third or intermediate ratio design, the output shaft runs at 1.0417 times or 25/24 times the speed of the input shaft. If the drive is interposed between elements of the driven equipment that can be connected through timing belts or gears, then an exact 1 to 1 speed relationship can be established by using a 25 tooth timing belt sheave at the input shaft 8 and a 24 tooth timing belt sheave at the output shaft 8a. Both timing belt drives would then go to identical tooth number sheaves on the driven equipment. In the case of gears a standard proportion 25 tooth gear can be used at input shaft 8e and a 24 tooth gear cut on a modified blank for 25 tooth used at output shaft 8ae with both gears meshing with same tooth number mating gears (at identical center distance) on the driven equipment. In the case of right angle gearing (as shown in FIG. 7) being an integral part of the drive then these bevel gears can be a 25/24 tooth combination (or 50/48) and the desired 1 to 1 speed ratio achieved. Or if an in-line coaxial configuration is required then an additional set of gearing identical to the main drive gearing but with a fixed in place carrier can be used in series with the original phase controlled gears to provide the exact 1 to 1 speed relationship.

Another important advantage of my proposed invention is that the torque into the carrier 17e and the worm gear teeth 19e is only a fraction of that imposed on the comparable carrier and worm gear teeth of competitive differentials. For example: the worm gear torque will be on the order of 1/24 or 4.17 percent of the torque being transmitted through the main drive shafts 8e and 8ae. In the case of a competitive internal gear planetary drive differential of 3 to 1 ratio (number of teeth in internal twice that of sun gear) the torque on the carrier and worm gear teeth will be on the order of 66.7 percent of the transmitted torque or 16 times greater than with my invention for this selected intermediate ratio unit. In the case of other competitive differentials utilizing bevel gears, the torque on the carrier and control worm will be 200.0 percent of the transmitted torque of 48 times greater than with my invention for this selected intermediate ratio unit.

The embodiments disclosed will be understood as being for illustrative purposes only. Various changes in structure will no doubt occur to those skilled in the art. For example, the input and output shafts have been shown as being coaxial. It will be apparent to those skilled in the art that bevel or crown gears could be used to provide for different angles between the input and output shafts. The invention will be understood as being restricted only by the following claims.

The invention is claimed as follows:

1. Differential gearing with phase adjustment comprising a pair of differential gear sets, respectively an input differential and an output differential gear set, said input gear set including an input carrier, a sun gear, a plurality of planet gears and an internal ring gear, said planet gears meshing with said sun gear and with said internal ring gear, means for rotationally driving said input carrier including an input shaft, said output gear set including an output carrier, a sun gear, a plurality of planet gears and an internal ring gear, said last mentioned planet gears meshing with said last mentioned sun gear and said last mentioned internal ring gear, means for respectively rotatively mounting both of said ring gears, an output shaft being connected to said output carrier, and control means connected to both of said ring gears, said control means being adapted to drive said input and said output ring gears at different speeds to effect controlled phase shifting between said input shaft and said output shaft, and friction clutch means acting between said input carrier and said output carrier to minimize backlash and to increase torque capacity.

2. Gearing as set forth in claim 1 wherein sun gears are fixed to one another.

3. Gearing as set forth in claim 2 wherein both of said sun gears are formed on a common element.

4. Gearing as set forth in claim 2 wherein said carriers comprise substantially mirror images of one another and have hollow spaces confronting one another, and said sun gears are formed on a common shaft extending through said hollow spaces and journaled in said carriers.

5. Gearing as set forth in claim 4 wherein said carriers have respectively confronting faces, and a clutch acting between said faces.

6. Gearing as set forth in claim 4 wherein said carriers have a common axis of rotation, and further including concentric annular surfaces respectively on said carriers, and said clutch comprises a ring between said surfaces.

7. Gearing as set forth in claim 1 wherein said input shaft and said output shaft are parallel to one another.

8. Gearing as set forth in claim 7 wherein said input shaft and said output shaft are coaxial with one another.

9. Gearing as set forth in claim 1 wherein said control means is further adapted to hold both of said ring gears stationary.

10. Gearing as set forth in claim 1 wherein said control means comprises a control gear, an input gear on said input internal ring gear and meshing with said control gear, an output gear on said output internal ring gear and meshing with said control gear, said input gear and said output gear having respectively different numbers of teeth thereon, said control gear when stationary holding both internal ring gears stationary and said input and said output shaft rotating in fixed phase relation, and said control gear when turned causing said carriers to rotate at respectively different speeds and the phase between said input and said output shafts changing, and means for controlling the rotation of said input gear.

11. Gearing as set forth in claim 10 wherein said gear comprises a worm, and wherein said input gear comprises a ½ worm gear, and said output gear comprises a ½ worm gear.

12. A power transmission with phase adjustment comprising a pair of similar gear sets, respectively an input gear set and an output set, means for rotationally driving said input gear set including an input shaft, an output shaft connected to an driven by said output gear set, and control means connected to both of said gear sets, said control means being adapted to produce different speeds of said input gear set and said output gear set to effect controlled phase shifting between said input shaft and said output shaft, and friction clutch means acting between said input gear set and said output gear set to minimize backlash and to increase torque capacity.

13. A power transmission as set forth in claim 12 wherein said friction clutch means comprises a substantially flat clutch disk, and a pair of substantially flat opposing surfaces respectively on said input and said output gear sets, said clutch disk being disposed between and in frictional engagement with said flat opposing surfaces.

14. A power transmission as set forth in claim 12 wherein said friction clutch means comprises a substantially cylindrical clutch ring, and a pair of substantially cylindrical opposing surfaces respectively on said input and said output gear sets, said clutch ring being disposed between said pair of cylindrical confronting surfaces and in frictional engagement therewith.

15. A power transmission as set forth in claim 12 wherein said friction clutch comprises a pair of substantially frustoconical surfaces each having a minimum and a maximum diameter, said frustoconical surfaces meeting at said large diameter, and a pair of frustoconical surfaces respectively on said input and said output gear sets and in frictional engagement with the surfaces of said frustoconical clutch.

16. Differential gearing with phase adjustment comprising a pair of gear sets comprising an input gear set and an output gear set each having a driven gear and a drive gear, the drive gear of said input gear set being coaxial with the driven gear of said output gear set, the driven gear of said input gear set being coaxial with the drive gear of said output gear set, and each driven and drive gear respectively fixed to an output shaft and an input shaft, said gear sets being of different ratios, a carrier, means rotatingly mounting said carrier for rotation coaxially with said driven gear of said output gear set and said drive gear of said input gear set, means connecting the driven gear of said input gear set and the drive gear of said output gear set, means rotatingly mounting said driven gear of said input gear set and said drive gear of said output gear set in said carrier and control means adapted to rotate said carrier to effect controlled phase shifting between said input shaft and said output shaft.

17. Differential gearing as set forth in claim 16 wherein said gear sets have gear tooth faces, and further including a friction clutch interposed between said input shaft and said output shaft to minimize backlash and to ensure contact between the gear tooth faces of said gear sets.

* * * * *